(12) United States Patent
Su

(10) Patent No.: US 7,546,752 B2
(45) Date of Patent: Jun. 16, 2009

(54) LOCK FOR STEERING WHEELS OF VEHICLES

(75) Inventor: Wen Chun Su, Shengang Shiang (TW)

(73) Assignee: Handyway Co., Ltd., Chang Hua (TW)

( * ) Notice: Subject to any disclaimer, the term of this patent is extended or adjusted under 35 U.S.C. 154(b) by 0 days.

(21) Appl. No.: 12/219,255

(22) Filed: Jul. 18, 2008

(65) Prior Publication Data
US 2009/0107191 A1 Apr. 30, 2009

(30) Foreign Application Priority Data
Oct. 24, 2007 (TW) .............................. 96217792 U

(51) Int. Cl.
*B60R 25/02* (2006.01)
(52) U.S. Cl. .......................................... 70/209; 70/226
(58) Field of Classification Search ................... 70/209, 70/211, 212, 225, 226, 237, 238
See application file for complete search history.

(56) References Cited

U.S. PATENT DOCUMENTS

| | | | | | |
|---|---|---|---|---|---|
| 4,103,524 A | * | 8/1978 | Mitchell et al. | ................ | 70/209 |
| 4,730,470 A | * | 3/1988 | Zane et al. | ..................... | 70/238 |
| 5,005,389 A | * | 4/1991 | Wang | .......................... | 70/209 |
| 5,024,069 A | * | 6/1991 | Hull et al. | ..................... | 70/209 |
| 5,142,889 A | * | 9/1992 | Liu | .............................. | 70/209 |
| 5,179,849 A | * | 1/1993 | Wang | .......................... | 70/209 |
| 5,435,158 A | * | 7/1995 | Ta-Yung | ....................... | 70/209 |
| 5,457,972 A | * | 10/1995 | Lo | ............................... | 70/209 |
| 5,609,050 A | * | 3/1997 | Yu | .............................. | 70/209 |
| 5,676,000 A | * | 10/1997 | Chen | .......................... | 70/209 |
| 5,722,270 A | * | 3/1998 | Yu | .............................. | 70/209 |
| 5,921,120 A | * | 7/1999 | Wu | ............................. | 70/209 |
| 6,668,604 B1 | * | 12/2003 | Hsieh | ......................... | 70/209 |
| 6,694,785 B1 | * | 2/2004 | Hsieh | ......................... | 70/209 |
| 6,758,072 B1 | * | 7/2004 | Elam | .......................... | 70/209 |
| 6,817,215 B1 | * | 11/2004 | Chen | .......................... | 70/209 |
| 6,901,781 B1 | * | 6/2005 | Lin | ............................. | 70/209 |
| 2008/0236217 A1 | * | 10/2008 | Ruffini | ........................ | 70/209 |
| 2008/0236218 A1 | * | 10/2008 | Chen | .......................... | 70/209 |

* cited by examiner

*Primary Examiner*—Lloyd A Gall
(74) *Attorney, Agent, or Firm*—Rosenberg, Klein & Lee

(57) ABSTRACT

A lock for steering wheels of vehicles includes a seat with an aperture formed at one end to receive a detent tube. The detent tube has a flute to hold an inner lining. The inner lining has a third pin hole. A latch bar is provided and insertable into a first holding hole of the detent tube and a second holding hole of the inner lining. The third pin hole is insertable by a third pin to anchor the latch bar. The latch bar can clamp two sides of a reinforced spoke of a steering wheel. The invention can be assembled quickly and easily, and provide improved theft-thwarting effect, and is adaptable to various steering wheels installed on varying locations of vehicles in different countries.

12 Claims, 12 Drawing Sheets

LOCK FOR STEERING WHEELS OF VEHICLES

BACKGROUND OF THE INVENTION

1. Field of the Invention

The present invention relates to a lock for steering wheels of vehicles and particularly to a lock that has a latch bar inserting into a first holding hole of a detent tube and a second holding hole of an inner lining and confined by an inserting third pin.

2. Description of the Prior Art

With people's living standard rising gradually for ROC, ownership of vehicles also increases. Loss of vehicles due to theft also occurs more frequently. Hence various types of locks for vehicles also have been developed and introduced. Among them locks for steering wheels are most popular. One example is R.O.C. utility publication No. 559149 entitled "Lock for steering wheels of vehicles" (referring to FIG. 12). It mainly has a hollow and tubular latch bar A with two slots A1 formed thereon and a detent bar A2 corresponding to the two slots A1. The latch bar A is coupled with a turnable element A3 which has two jutting latch elements A4 corresponding to the two slots A1. The detent bar A2 straddles the periphery of a steering wheel B, and the turnable element A3 is turned in a reverse direction for anchoring and driving the two latch elements A4 from one side to another side to latch on one side of the detent bar A2. And the steering wheel B has a reinforced spoke B1 clamped between the two latch elements A4 to achieve theft-thwarting effect. The turnable element A3 is located on the right side of the latch bar A. Thus it is adoptable to the steering wheel B located on the left hand side of the vehicle. But in some countries the steering wheel of the vehicles is located on the right hand side. The slots A1 have to be formed in the opposite direction. The steering wheel B is easily cut off at such a location. Moreover, after the turnable element A3 is held in the latch bar A the latch elements A4 have to be installed and fastened. Alignment and installation are troublesome. Fabrication also is more difficult.

SUMMARY OF THE INVENTION

In view of the aforesaid problems occurred to the conventional lock for steering wheels of vehicles that are not very effective to thwart theft and not adaptable to steering wheels installed on different locations, the present invention aims to provide an improved lock for steering wheels of vehicles. It has a seat formed with a housing chamber covered by an upper cap and an aperture located thereon, a latch core assembly located in the seat to drive a latch lever, and a detent tube inserting in the seat through the aperture at one side. The detent tube has a flute and a first holding hole leading to the flute and a first latch trough. There is also an inner lining held in the flute of the detent tube. The inner lining has a third pin hole insertable by a third pin and a second holding hole leading to the third pin hole. A latch bar is provided and insertable into the first holding hole of the detent tube and the second holding hole of the inner lining. The latch bar has an anchor portion at one end. There is further a lateral plug held in the aperture of the seat.

In one aspect the upper cap has a holding trough to hold the latch core assembly. The holding trough has a first pin hole to receive a first pin to anchor the latch core assembly.

In another aspect the upper cap has a retaining notch.

In yet another aspect the aperture has a first anchor trough formed on an inner wall at one end thereof. The lateral plug has a first anchor lug on the periphery thereof to wedge in the first anchor trough.

In yet another aspect the seat has a second pin hole leading to the aperture. The lateral plug has a pin hole on the periphery. The second pin hole and the pin hole are insertable by a second pin.

In yet another aspect the upper cap has an anchor strut. The latch core assembly has a latch core. The latch core is incorporated with the anchor strut coupling with a first elastic element, and the latch lever is hinged on the anchor strut.

In yet another aspect one end of the detent tube where the flute is formed has a second anchor trough. The inner lining has a jutting second anchor lug at one end to wedge in the second anchor trough.

In yet another aspect the inner lining has a second latch trough at one end. The lateral plug has a cavity to hold a second elastic element and a steel ball. The steel ball is held in the second latch trough.

In yet another aspect the anchor portion is an annular groove.

In yet another aspect the anchor portion is a cavity.

In yet another aspect the latch core assembly has a latch core to drive a flipping element which has a first elastic element to drive the latch lever.

In yet another aspect the seat has a latch trough.

The invention thus formed can provide many advantages, notably:

1. The latch bar is insertable into the first holding hole of the detent tube and the second holding hole of the inner lining, and the third pin is insertable in the third pin hole to confine the latch bar. Assembly can be done easily and quickly.

2. The latch bar can be fastened to the reinforced spoke of the steering wheel. Even if the steering wheel is cut off, the latch bar still latches two sides of the reinforced spoke. Thus theft-thwarting effect can be accomplished.

3. The detent tube is inserted and installed through the aperture formed on any end of the seat. It is adaptable to different locations where the steering wheel is installed (right side or left side) in different countries, thus is more versatile.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
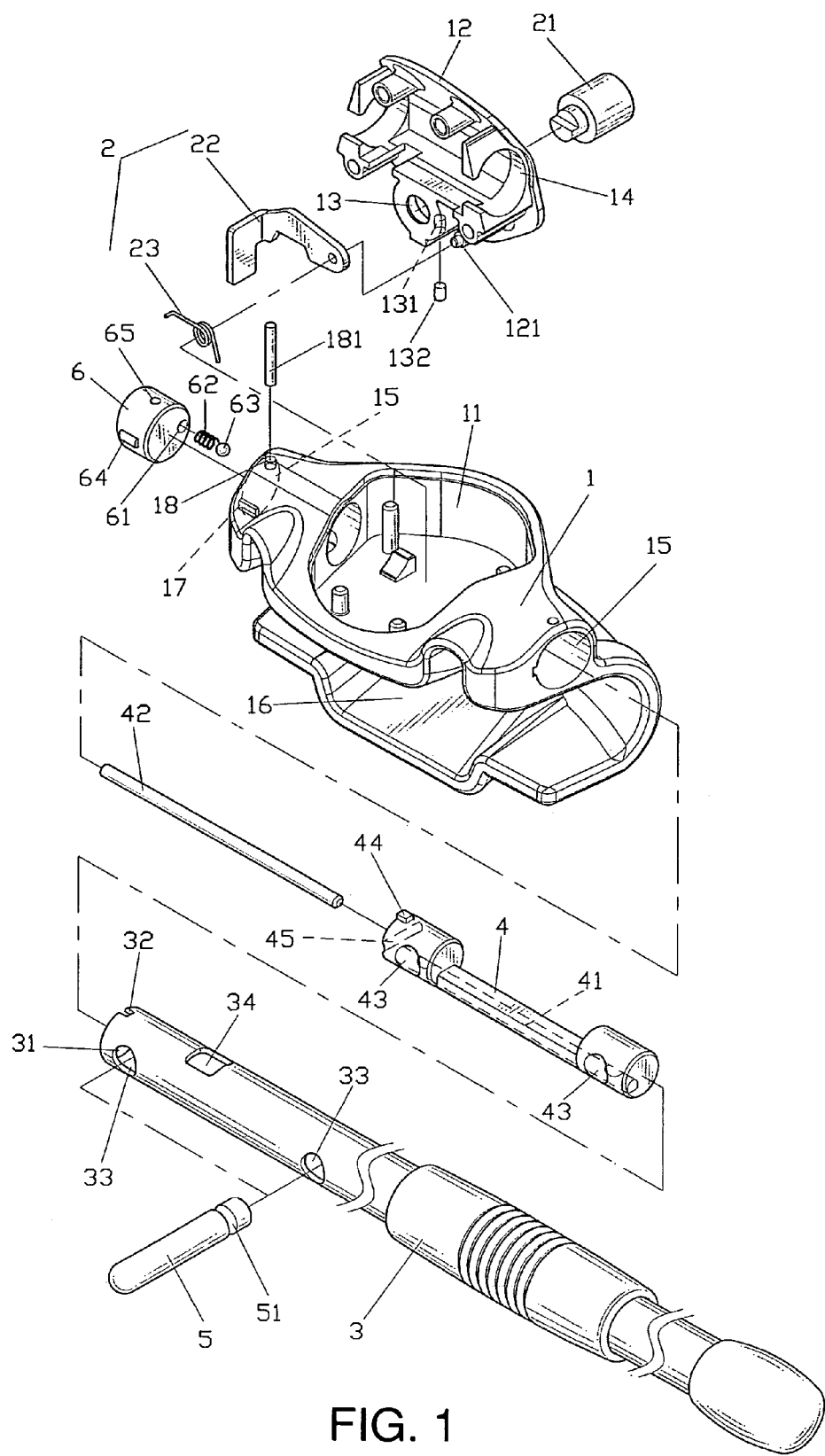
FIG. 1 is an exploded view of the invention.

Please referring to FIG. 1, the invention mainly includes a seat 1, a latch core assembly 2, a detent tube 3, an inner lining 4, a latch bar 5 and a lateral plug 6.

The seat 1 has a housing chamber 11 at the top end coupling with an upper cap 12. The upper cap 12 has a jutting anchor strut 121, a holding trough 13 and a retaining notch 14. The holding trough 13 communicates with a first pin hole 131 which is insertable by a first pin 132. The seat 1 further has an aperture 15 running through the housing chamber 11 and an arched latch trough 16. One end of the seat where the aperture 15 is formed has a first anchor trough 17 and a second pin hole 18 on an inner wall. The second pin hole 18 is insertable by a second pin 181.

The latch core assembly 2 is located in the upper cap 12, and has a latch core 21 held and anchored in the holding trough 13 of the upper cap 12 by inserting the first pin 132 into the first pin hole 131. The latch core 21 can drive a latch lever 22 which is hinged on the anchor strut 121 through a first elastic element 23. Thus the latch lever 22 can be rocked to and fro about the anchor strut 121 through the first elastic element 23.

The detent tube 3 is inserted in the seat 1 through the aperture 15 at any side thereof. It has an axial flute 31 at one end. The one end where the flute 31 is formed has a second anchor trough 32 formed on the end surface and a first holding hole 33 leading to the flute 31. The detent tube 3 further has a first latch trough 34 formed on the periphery to be latched by the latch lever 22.

The inner lining 4 is fixedly held in the flute 31 of the detent tube 3, and has a third pin hole 41 axially formed at one end thereof insertable by a third pin 42. The inner lining 4 also has a second holding hole 43 formed on the periphery leading to the third pin hole 41 and corresponding to the first holding hole 33 of the detent tube 3, and a jutting second anchor lug 44 at one end to wedge in the second anchor trough 32 of the detent tube 3, and a second latch trough 45 at one end.

The latch bar 5 is fixedly inserted in the first holding hole 33 of the detent tube 3 and the second holding hole 43 of the inner lining 4, and has an anchor portion 51 at one end thereof. The anchor portion 51 may be an annular groove.

The lateral plug 6 is fixedly held in the aperture 15 at one end of the seat 1, and has a cavity 61 to hold a second elastic element 62 and a steel ball 63, and a first anchor lug 64 and a pin hole 65 on the periphery thereof. The first anchor lug 64 is wedged in the first anchor trough 17 of the seat 1. The pin hole 65 is insertable by the second pin 181.

Figure 2:
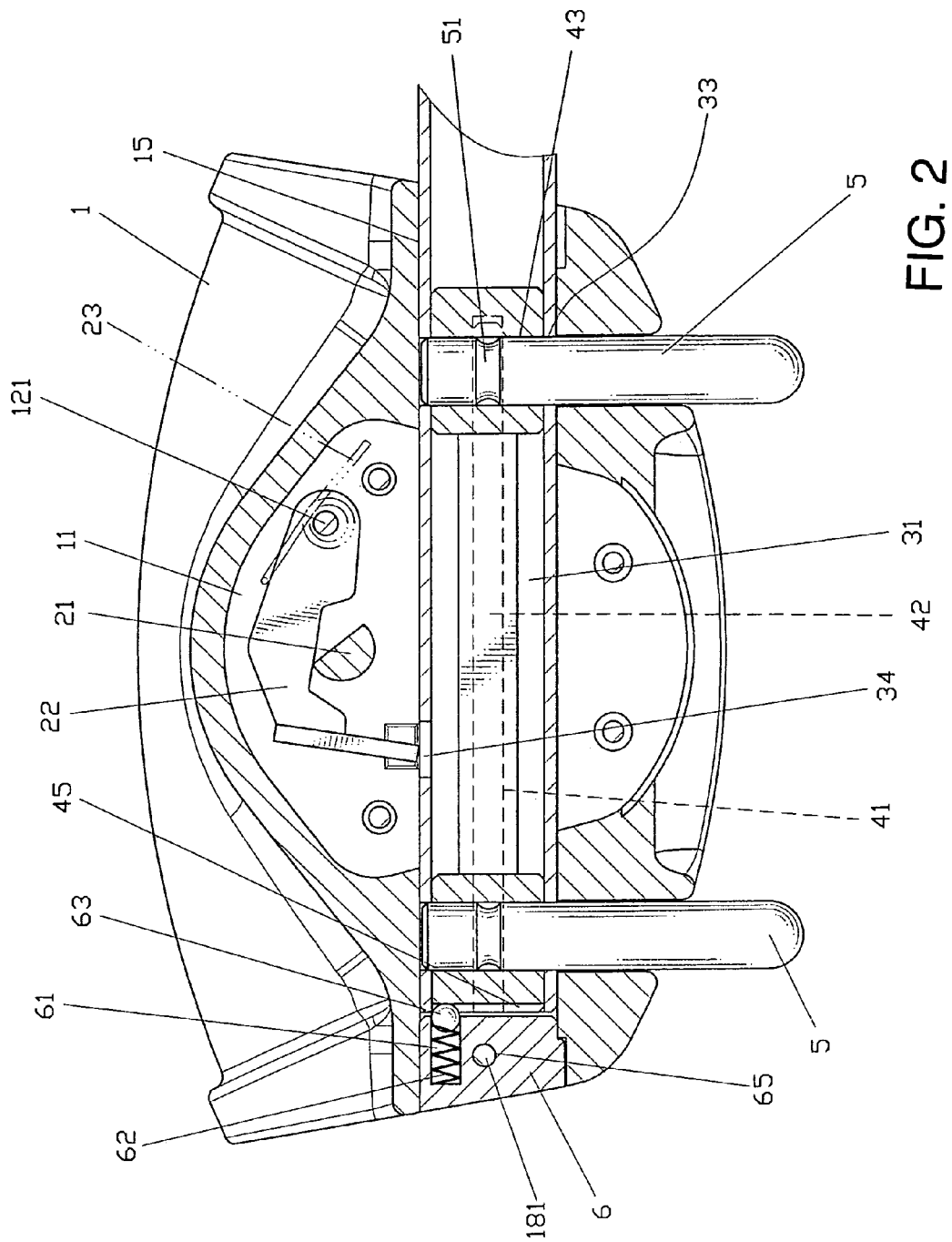
FIG. 2 is a fragmentary sectional view of the invention.

For assembly, referring to FIG. 2, first, dispose the latch core assembly 2 on the upper cap 12, and place the upper cap 12 in the housing chamber 11 of the seat 1 to hold the latch core assembly 2; insert the detent tube 3 through the aperture 15 at a desired end of the seat 1 to run through the retaining notch 14 of the upper cap 1 so that the upper cap 12 does not escape from the seat 1; such a structure is adaptable to steering wheels located either on the left side or right side of vehicles in different countries; next, dispose the inner lining 4 in the flute 31 of the detent tube 3 with the second anchor lug 44 wedged in the second anchor trough 32 of the detent tube 3 such that the second holding hole 43 is rapidly aligned with the first holding hole 33 of the detent tube 3; then the latch bar 5 is inserted in the first holding hole 33 and the second holding hole 43, while the third pin 42 is inserted into the third pin hole 41 to transversely latch on the anchor portion 51 to anchor the latch bar 5 on the detent tube 3. Meanwhile the detent tube 3 is positioned on the seat 1, and the lateral plug 6 is disposed in the aperture 15 of the seat 1 such that the first anchor lug 64 is wedged in the first anchor trough 17 of the seat 1, while the second pin 181 is inserted into the second pin hole 18 and the pin hole 65 so that the lateral plug 6 seals the detent tube 3 at a desired location. Such a structure makes assembly simpler and easier.

Figure 3:
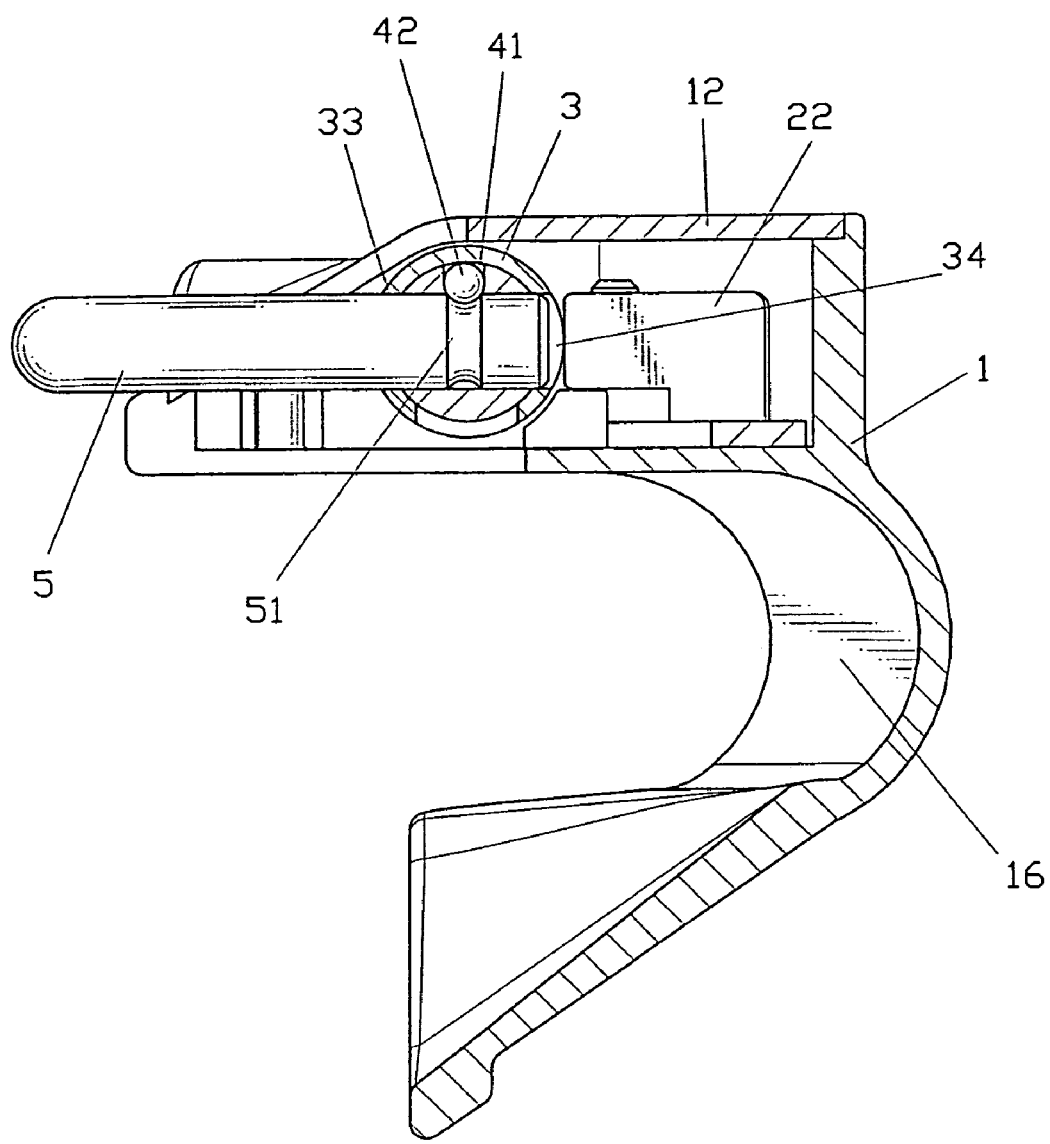
FIG. 3 is a schematic view of the invention showing the latch bar not yet being turned in a latch condition.
Figure 4:
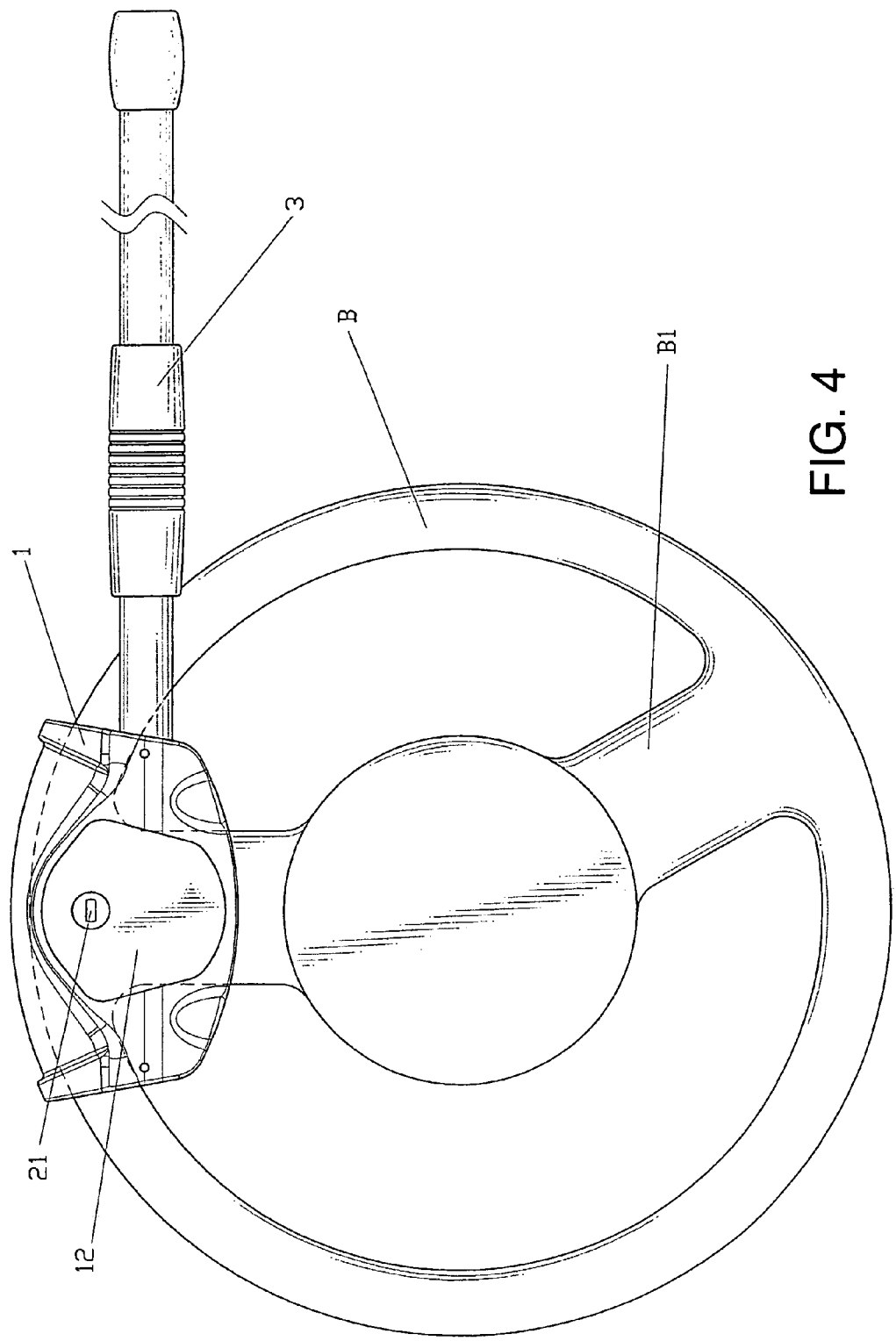
FIG. 4 is a schematic view of the invention in use condition.
Figure 5:
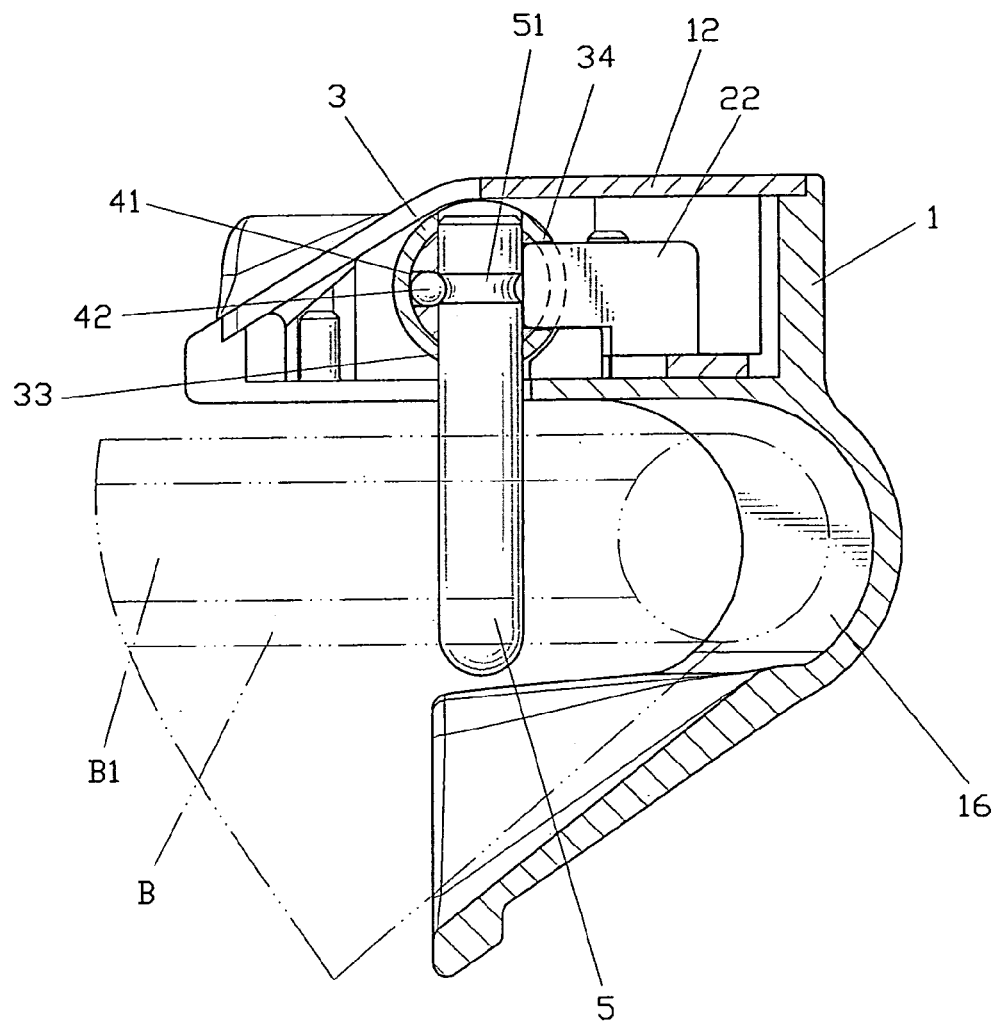
FIG. 5 is a schematic view of the invention showing the latch bar being turned in a latch condition.
Figure 6:
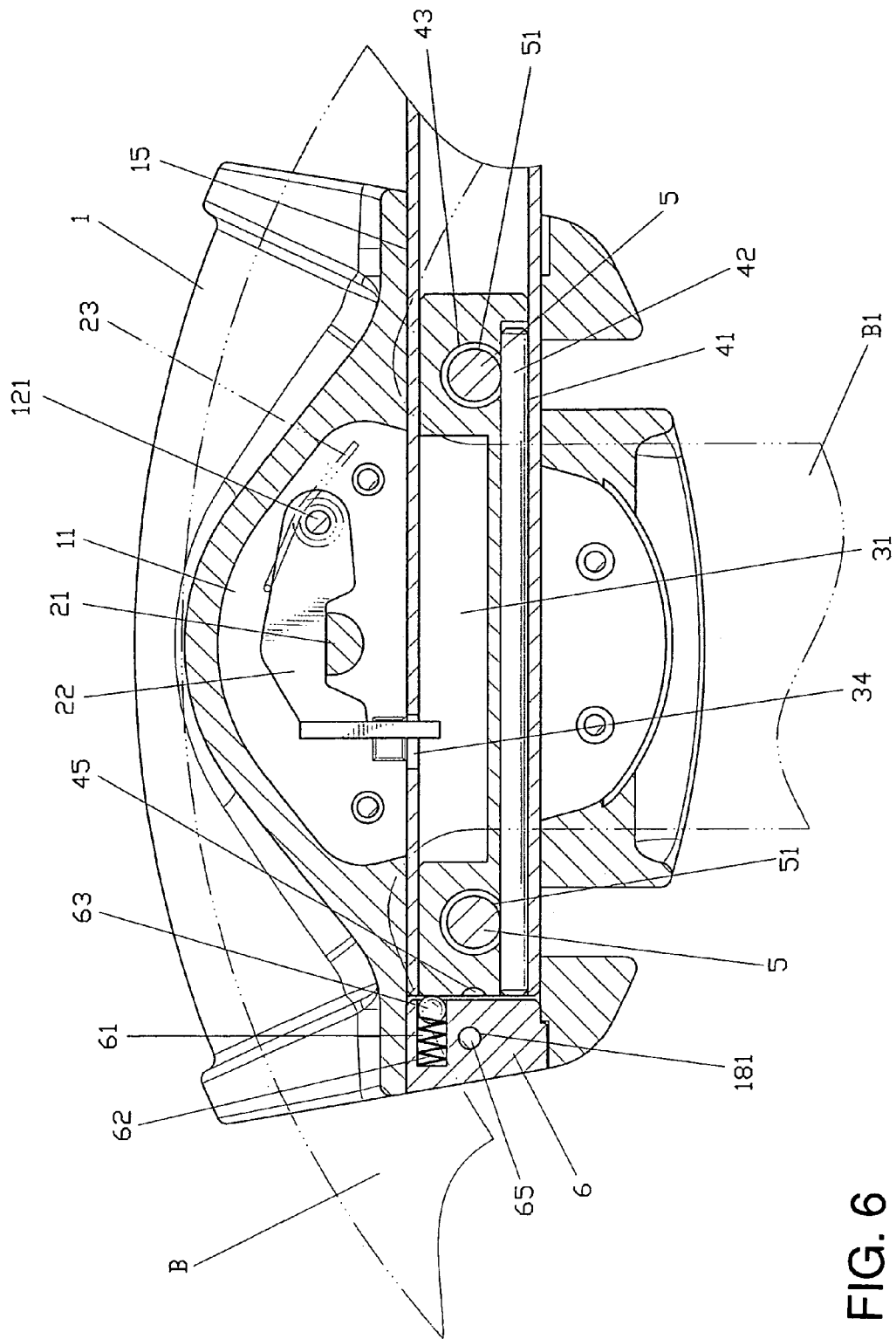
FIG. 6 is a schematic view of the invention showing the latch lever pressing the detent tube.

When in use, referring to FIGS. 4, 5 and 6, couple the latch trough 16 of the seat 1 on a reinforced spoke B1 of a steering wheel B; turn the detent tube 3 about 90 degrees to allow the latch bar 5 to clamp two sides of the reinforced spoke B1; the latch lever 22 presses the first latch trough 34 of the detent tube 3 through the elastic force of the first elastic element 23 so that the seat 1 is latched on the steering wheel B. In such a condition even if the steering wheel B is cut off by a theft, the latch bar 5 still clamps the two sides of the reinforced spoke B1. Thus a theft-thwarting effect can be accomplished. For unlocking, referring to FIGS. 2 and 3, insert a key (not shown in the drawings) into the latch core 21 of the latch core assembly 2; turn the key to drive the latch lever 22 to escape from the first latch trough 34 so that it is retracted to compress the first elastic element 23; next, turn the detent tube 3 reversely about 90 degrees so that the latch bar 5 no longer clamps the two sides of the reinforced spoke B1, and the steel ball 63 in the lateral plug 6 is wedged in the second latch trough 45 of the inner lining 4 because of the elastic force of the second elastic element 62, and anchored and cannot be turned freely. Then the seat 1 can be disengaged and removed from the steering wheel B.

Figure 7:
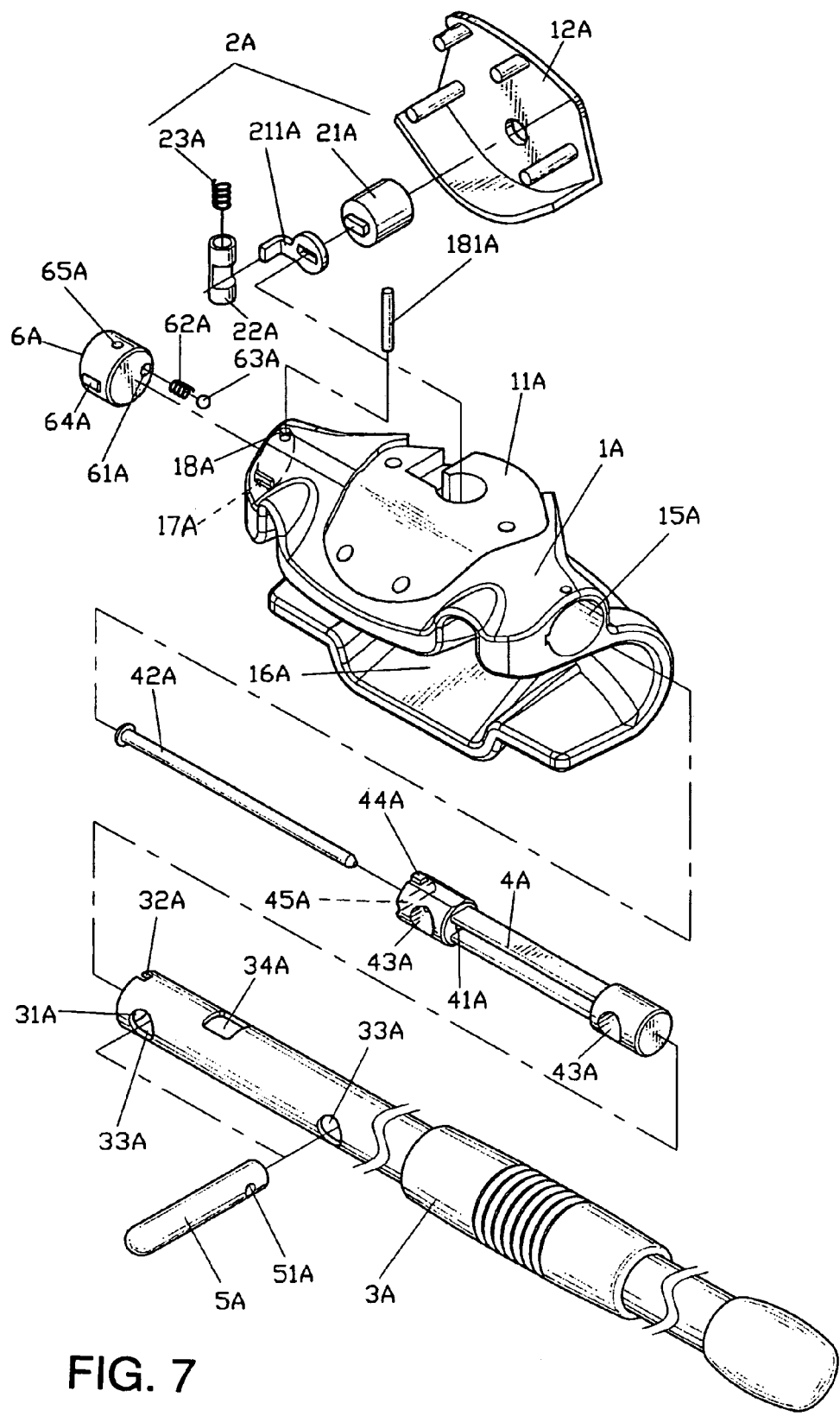
FIG. 7 is an exploded view of another embodiment of the invention.

Refer to FIG. 7 for another embodiment of the invention. It mainly includes:

a seat 1A which has a housing chamber 11A at the top end coupling with an upper cap 12A; an aperture 15A running through the housing chamber 11A and an arched latch trough 16A. One end of the seat where the aperture 15A is formed has a first anchor trough 17A and a second pin hole 18A formed on an inner wall thereof. The second pin hole 18A is insertable by a second pin 181A;

a latch core assembly 2A which is located on the upper cap 12A, and has a latch core 21A held in the housing chamber 11A to drive a flipping element 211A which is coupled with a first elastic element 23A to drive a latch lever 22A to move to and fro;

a detent tube 3A which is inserted in the seat 1A through the aperture 15A at any side thereof. It has an axial flute 31A at one end. The one end where the flute 31A is formed has a second anchor trough 32A on the end surface and a first holding hole 33A leading to the flute 31A. The detent tube 3A further has a first latch trough 34A formed on the periphery to be latched by the latch lever 22A;

an inner lining 4A which is fixedly held in the flute 31A of the detent tube 3A, and has a third pin hole 41A axially formed at one end thereof insertable by a third pin 42A. The inner lining 4A also has a second holding hole 43A formed on the periphery leading to the third pin hole 41A and corresponding to the first holding hole 33A of the detent tube 3, a jutting second anchor lug 44A at one end to wedge in the second anchor trough 32A of the detent tube 3A, and a second latch trough 45A at the one end;

a latch bar 5A which is fixedly inserted in the first holding hole 33A of the detent tube 3A and the second holding hole 43A of the inner lining 4A, and has an anchor portion 51A at one end thereof. The anchor portion 51A may be a cavity.

a lateral plug 6A which is fixedly held in the aperture 15A at one end of the seat 1A, and has a cavity 61A to hold a second elastic element 62A and a steel ball 63A, and a first anchor lug 64A and a pin hole 65A on the periphery thereof. The first anchor lug 64A is wedged in the first anchor trough 17A of the seat 1A. The pin hole 65A is insertable by the second pin 181A.

Figure 8:
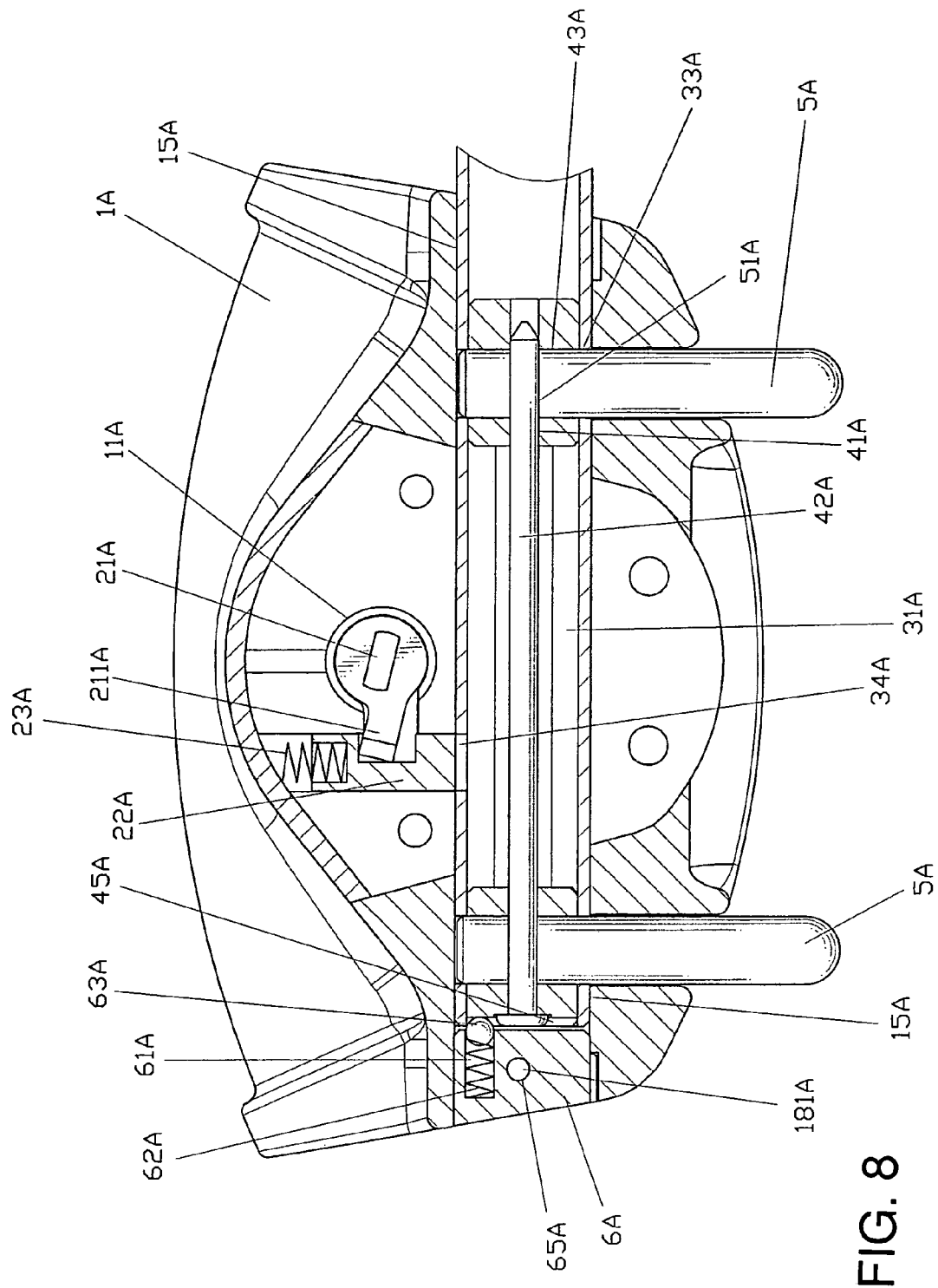
FIG. 8 is a fragmentary sectional view of another embodiment of the invention.
Figure 9:
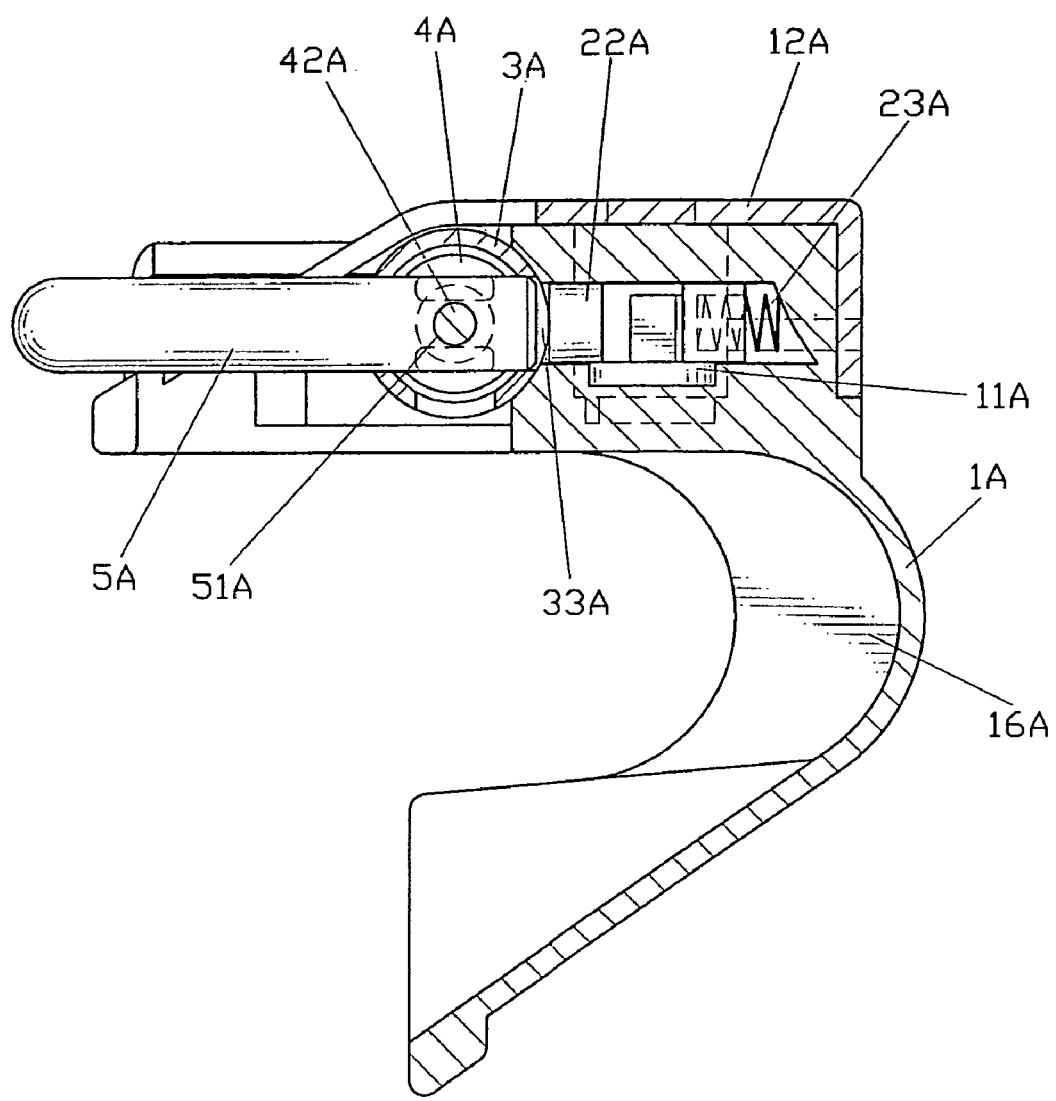
FIG. 9 is a schematic view of another embodiment of the invention showing the latch bar not yet being turned in a latch condition.

For assembly, referring to FIGS. 8 and 9, first, dispose the latch core assembly 2A in the housing chamber 11A of the seat 1A and place the upper cap 12A in the housing chamber 11A to hold the latch core assembly 2A; insert the detent tube 3A through the aperture 15A at a desired end of the seat 1A; such a structure is adaptable to steering wheels located either on the left side or right side of vehicles in different countries; next, dispose the inner lining 4A in the flute 31A of the detent tube 3A with the second anchor lug 44A wedged in the second anchor trough 32A of the detent tube 3A such that the second holding hole 43A is rapidly aligned with the first holding hole 33A of the detent tube 3A, then the latch bar 5A is inserted in the first holding hole 33A and the second holding hole 43A, while the third pin 42A is inserted into the third pin hole 41A to transversely latch on the anchor portion 51A to anchor the latch bar 5A on the detent tube 3A. Meanwhile the detent tube 3A is positioned on the seat 1A, and the lateral plug 6A is disposed in the aperture 15A of the seat 1A such that the first anchor lug 64A is wedged in the first anchor trough 17A of the seat 1A, while the second pin 181A is inserted into the second pin hole 18A and the pin hole 65A so that the lateral plug 6A seals the detent tube 3 at a desired location. Such a structure makes assembly simpler and easier.

Figure 10:
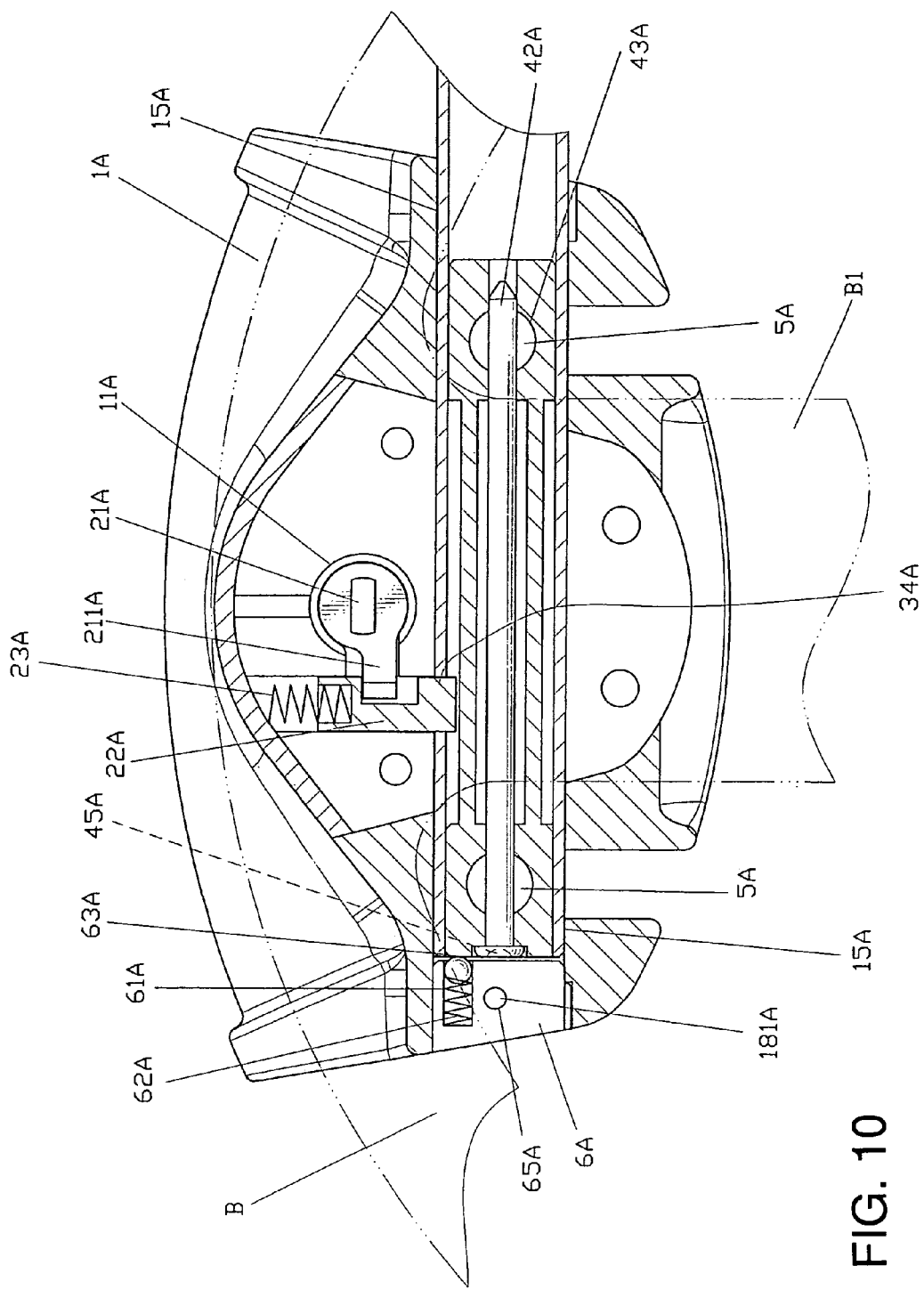
FIG. 10 is a schematic view of another embodiment of the invention showing the latch lever pressing the detent tube.
Figure 11:
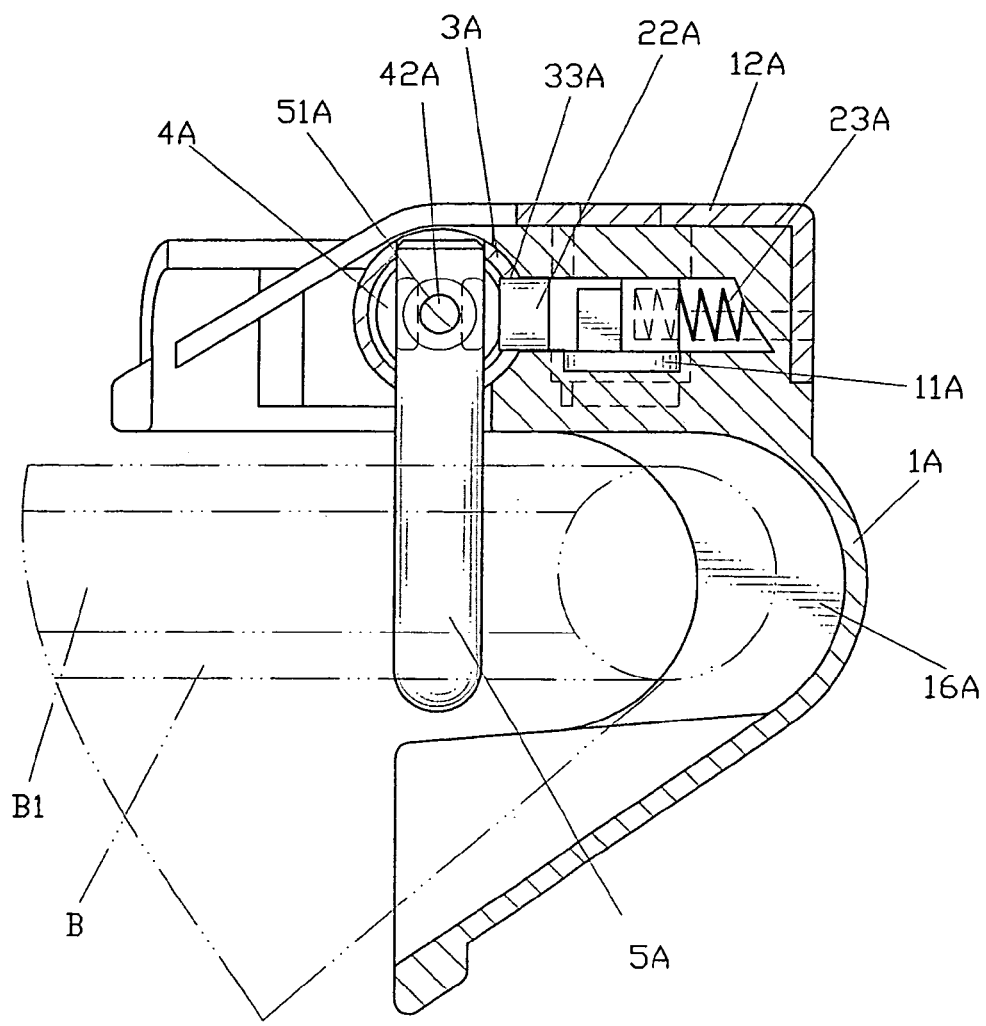
FIG. 11 is a schematic view of another embodiment of the invention showing the latch bar being turned in a latch condition.
Figure 12:
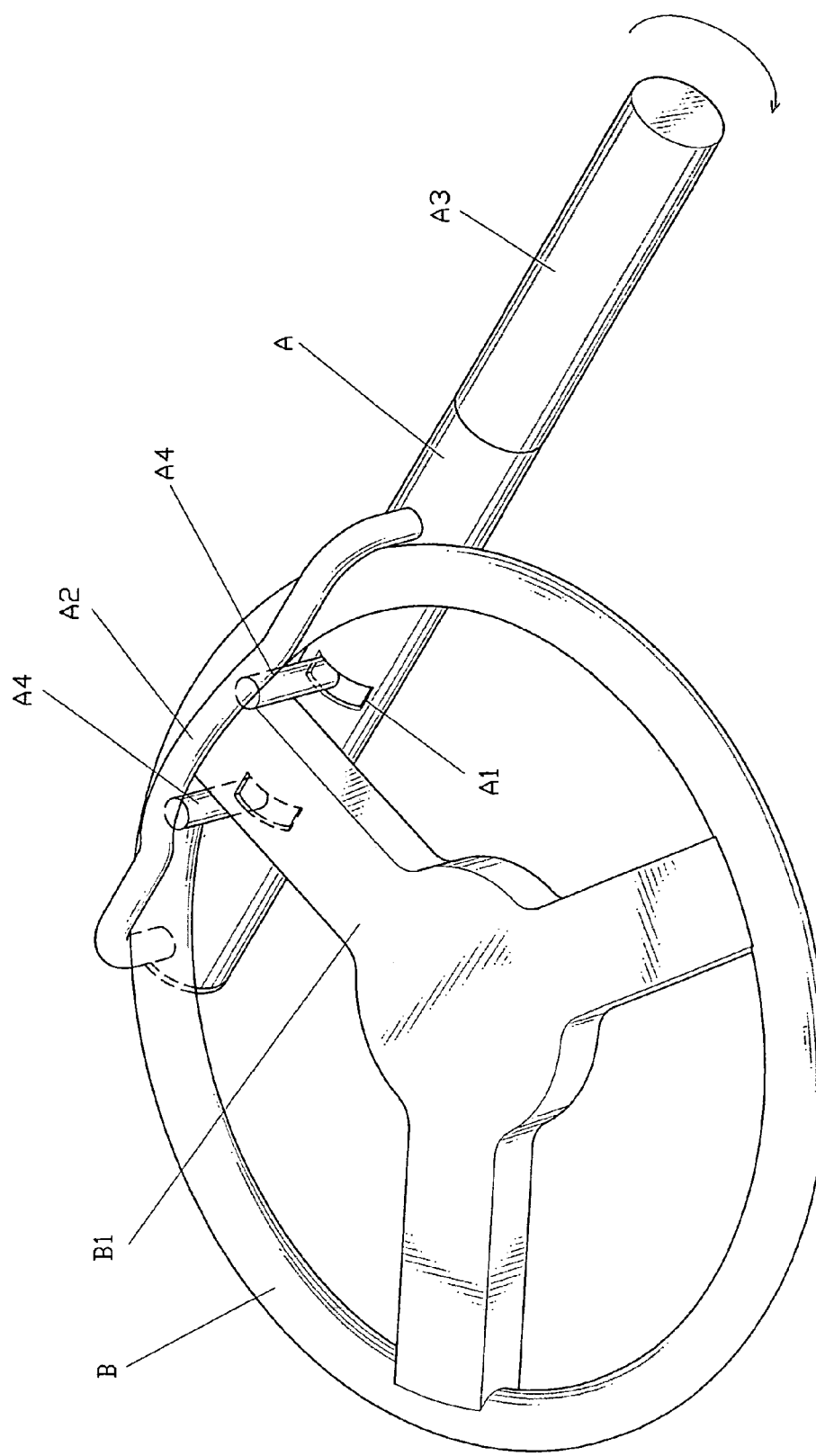
FIG. 12 is a schematic view of a conventional lock for a steering wheel of a vehicle in a use condition.

When in use, referring to FIGS. 10 and 11, couple the latch trough 16A of the seat 1A on a reinforced spoke B1 of a steering wheel B; turn the detent tube 3A about 90 degrees to allow the latch bar 5A to clamp two sides of the reinforced spoke B1; the latch lever 22A presses the first latch trough 34A of the detent tube 3A through the elastic force of the first elastic element 23A so that the seat 1A is latched on the steering wheel B. In such a condition, even if the steering wheel B is cut off by a theft, the latch bar 5A still clamps the two sides of the reinforced spoke B1. Thus a theft-thwarting effect can be accomplished. For unlocking, referring to FIGS. 8 and 9, insert a key (not shown in the drawings) into the latch core 21A of the latch core assembly 2A; turn the key to drive the latch lever 22A to escape from the first latch trough 34A so that it is retracted to compress the first elastic element 23A; next, turn the detent tube 3A reversely about 90 degrees so that the latch bar 5A no longer clamps the two sides of the reinforced spoke B1, and the steel ball 63A in the lateral plug 6A is wedged in the second latch trough 45A of the inner lining 4A because of the elastic force of the second elastic element 62A, and anchored and cannot be turned freely. Then the seat 1A can be disengaged and removed from the steering wheel B.

I claim:

1. A lock for steering wheels of vehicles, comprising:
   a seat which has a housing chamber coupling with an upper cap and an aperture formed thereon;
   a latch core assembly located in the seat to drive a latch lever;
   a detent tube which is inserted in the seat through the aperture on a desired side thereof and has a flute and a first holding hole leading to the flute and a first latch trough formed thereon;
   an inner lining which is fixedly held in the flute of the detent tube and has a third pin hole insertable by a third pin and a second holding hole leading to the third pin hole;
   a latch bar which is fixedly inserted in the first holding hole of the detent tube and the second holding hole of the inner lining, and has an anchor portion at one end thereof; and;
   a lateral plug fixedly located in the aperture of the seat.

2. The lock for steering wheels of vehicles of claim 1, wherein the upper cap has a holding trough to hold the latch core assembly, the holding trough having a first pin hole insertable by a first pin to anchor the latch core assembly.

3. The lock for steering wheels of vehicles of claim 1, wherein the upper cap has a retaining notch.

4. The lock for steering wheels of vehicles of claim 1, wherein the aperture is formed at one end of the seat that has an inner wall with a first anchor trough formed thereon, the lateral plug having a first anchor lug wedged in the first anchor trough.

5. The lock for steering wheels of vehicles of claim 1, wherein the seat has a second pin hole leading to the aperture, the lateral plug having a pin hole on the periphery thereof, the second pin hole and the pin hole being insertable by a second pin.

6. The lock for steering wheels of vehicles of claim 1, wherein the upper cap has an anchor strut, the latch core assembly having a latch core incorporating with the anchor strut through a first elastic element, the latch lever being hinged on the anchor strut.

7. The lock for steering wheels of vehicles of claim 1, wherein the flute is located at one end of the detent tube that has a second anchor trough formed thereon, the inner lining having a jutting second anchor lug at one end thereof to wedge in the second anchor trough.

8. The lock for steering wheels of vehicles of claim 1, wherein the inner lining has a second latch trough at one end, the lateral plug having a cavity to hold a second elastic element and a steel ball which is wedged in the second latch trough.

9. The lock for steering wheels of vehicles of claim 1, wherein the anchor portion is an annular groove.

10. The lock for steering wheels of vehicles of claim 1, wherein the anchor portion is a cavity.

11. The lock for steering wheels of vehicles of claim 1, wherein the latch core assembly has a latch core coupling with a flipping element to drive the latch lever through a first elastic element.

12. The lock for steering wheels of vehicles of claim 1, wherein the seat has a latch trough.

* * * * *